(12) United States Patent  
Yoo (10) Patent No.: US 11,870,387 B2  
(45) Date of Patent: Jan. 9, 2024

(54) CORNER PIECE FOR PALLETIZATION OF SOLAR CELL PANELS

(71) Applicant: Sang Chae Chung Yoo, Gyeonggi-do (KR)

(72) Inventor: Sang Chae Chung Yoo, Gyeonggi-do (KR)

( * ) Notice: Subject to any disclaimer, the term of this patent is extended or adjusted under 35 U.S.C. 154(b) by 54 days.

(21) Appl. No.: 17/150,544

(22) Filed: Jan. 15, 2021

(65) Prior Publication Data

US 2022/0231634 A1 Jul. 21, 2022

(51) Int. Cl.  
*H02S 30/10* (2014.01)

(52) U.S. Cl.  
CPC .................... *H02S 30/10* (2014.12)

(58) Field of Classification Search  
CPC .......... H02S 30/00; H02S 30/10; H02S 40/00; B65D 81/057  
See application file for complete search history.

(56) References Cited

U.S. PATENT DOCUMENTS

| | | | | |
|---|---|---|---|---|
| 9,669,985 B1* | 6/2017 | Hudson | ................ | B65D 81/057 |
| 2006/0005875 A1* | 1/2006 | Haberlein | ............... | H01L 31/02 |
| | | | | 136/251 |
| 2011/0220598 A1* | 9/2011 | Flossmann | .............. | H01L 31/02 |
| | | | | 211/59.4 |
| 2016/0359451 A1* | 12/2016 | Mao | ........................ | H02S 20/23 |
| 2017/0137200 A1* | 5/2017 | Hudson | ................ | B65D 81/057 |
| 2019/0305715 A1* | 10/2019 | Gorny | .................... | B65D 57/00 |

* cited by examiner

*Primary Examiner* — Bethany L Martin  
(74) *Attorney, Agent, or Firm* — IPLA P.A.

(57) ABSTRACT

Proposed is a corner piece for palletization of solar cell panels, wherein the corner piece prevents stacked solar cell panels from colliding with each other, keeps the stacked solar cell panels from being shaken or impacted, and enables a solar cell panel having a frame fabricated with two types of sides having different widths to be interlocked. The corner piece includes: a right-angled corner part covering two right-angled sides of a frame of a solar cell panel, a support piece supporting the frame thereon; a pressing piece extending inward from the right-angled corner part so as to press the frame, and having a first locking protrusion; a fixing protrusion part protruding upward from the top of the right-angled corner part; and a concave hole formed in the lower surface of the right-angled corner part so as to receive the fixing protrusion part of another corner piece for combination.

17 Claims, 6 Drawing Sheets

CORNER PIECE FOR PALLETIZATION OF SOLAR CELL PANELS

CROSS REFERENCE TO RELATED APPLICATION

The present application claims priority to Korean Patent Application No. 10-2020-0006205, filed Jan. 16, 2020, the entire contents of which is incorporated herein for all purposes by this reference.

BACKGROUND OF THE INVENTION

Field of the Invention

The present disclosure relates to a corner piece for palletization of solar cell panels and, more particularly, to a corner piece for palletization of solar cell panels, wherein the corner piece prevents the stacked solar cell panels from colliding with each other when multiple completely manufactured solar cell panels are stacked, keeps the multiple stacked solar cell panels from shaking or being impacted when the stacked solar cell panels are transferred, and enables a solar cell panel having a frame fabricated with two types of sides having different widths to be interlocked on one corner piece.

Description of the Related Art

In general, a solar cell is a cell that converts sunlight into electricity by PN junction of a semiconductor, and it does not need to refuel. In addition, it has been known for a long time that a solar cell does not leave unnecessary fuel residues while making energy.

This solar cell panel includes a large solar cell plate made of glass, a metal frame covering the outer perimeter of the solar cell plate, and a solar electrode element gathering solar heat on a first side of the solar cell plate.

The solar cell panel is large and the solar cell plate is made of glass, so that the solar cell panels must be stacked on top of each other for storing and transferring same in large quantities during the production process.

When the solar cell panels are stacked in multiple layers as described above, if the solar cell panels are stacked without the corner piece, the frames of the solar cell panels are in direct contact with other frames, resulting in defects such as scratches or dents on the frames.

In addition, when transferring the stacked solar cell panels using a vehicle, etc., vibration and impact from the outside of the panel are directly transmitted to the solar cell panel, resulting in economic loss because of the damage to the solar cell plate made of glass.

To solve this problem, recently, corrugated cardboard having a certain thickness is laid at each corner of the frame forming the solar cell panel so that the stacked frames do not directly contact each other and the corrugated cardboard absorbs vibrations and impacts from the outside to prevent damage. However, the corrugated cardboard is only a temporary measure and does not solve the fundamental problem.

Also, when transferring the solar cell panels by a vehicle in a state of being stacked in multiple layers, in order to prevent the stacked multiple solar cell panels from being shaken, the solar cell panels are fixed by a fixing band. However, the fixing band has a problem that a solar panel frame may be dented because fixing band directly binds the frames of the solar cell panel.

In order to solve these problems, various types of corner pieces have been developed and used.

Among the conventional corner pieces as stated above, United States Patent Application Publication No. US 2011/0220598 has been introduced.

The conventional corner piece includes a right-angled corner part configured to cover two right-angled sides of a frame that constitutes a solar cell panel, at a corner of the frame, a support piece enabling the frame to be laid thereon, at a corner of a bottom surface of an inner side of the right-angled corner part, and a support part extended to the support piece, provided with a locking protrusion on the distal end thereof. When the corner piece is assembled at the corner of a rectangular shape, the two sides of the panel at the corner thereof will be covered with the corner piece and inserted into the corner piece by the support pieces located at the upper and lower sides of the corner piece, and the protrusion will be fixed on the inner side of the panel assembled by right-angles so that the corner piece does not separate arbitrarily from the panel.

Figure 1A:
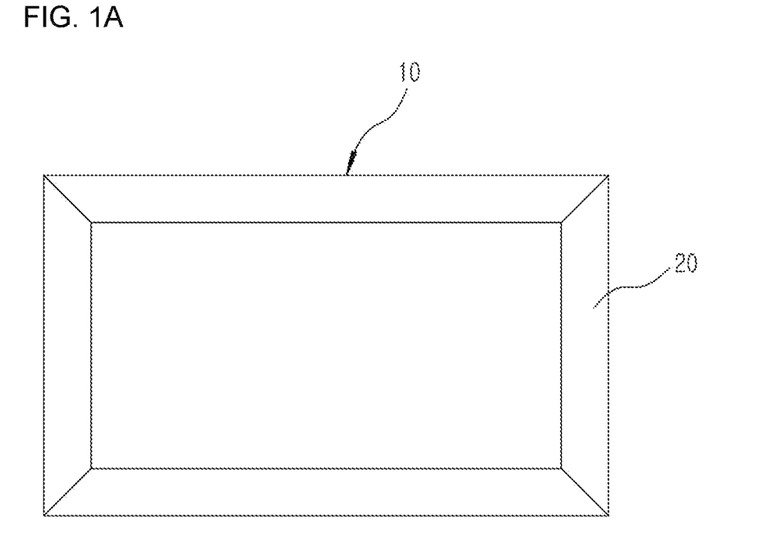
FIG. 1A is a view illustrating a solar cell panel assembled with sides of a frame of the same width.
Figure 1B:
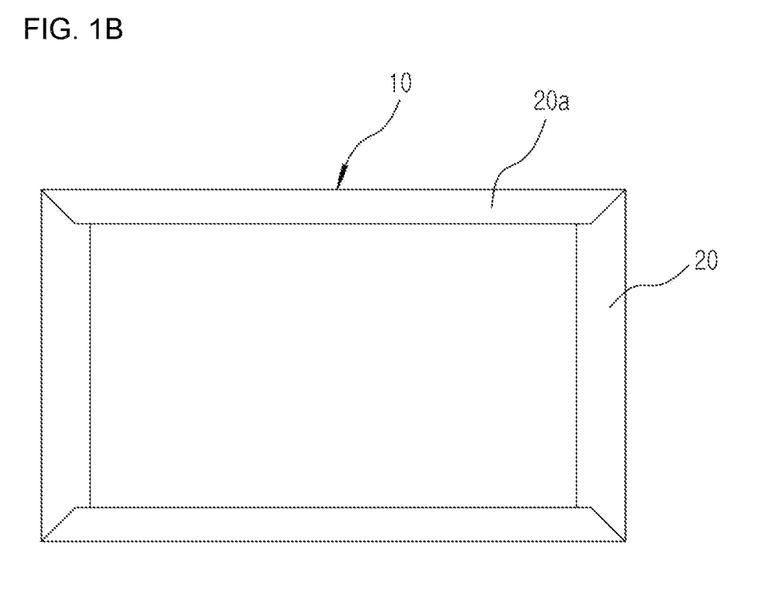
FIG. 1B is a view illustrating of a solar cell panel assembled with sides of a frame of different widths.

However, the currently used solar cell panel 10 is one that is provided by connecting sides 20 of a frame having the same width to each other to become rectangular as shown in FIG. 1A, or by connecting sides 20 and 20a of a frame having two different widths to each other to become rectangular as shown in FIG. 1B. In the case of using the sides 20 of the frame having the same width as in FIG. 1A, the locking protrusion can be tightly fixed on the inner side of the frame and can be stably coupled, but in the case of using the sides 20 and 20a of the frame having two different widths as shown in FIG. 1B, the locking protrusion cannot be caught on the inner side of the frame because the width of the sides of the frame do not match. If a panel is constructed and produced only with the side 20 or the side 20a having the same width, there will be an economic burden because two types of corner pieces for each of the two types of sides of the frame with different widths have to be produced. In addition, even if the two types of corner pieces are produced as described above, it is inconvenient in handling because it is required to prepare the two types of corner pieces at a work site and to selectively use a corner piece that fits the width of the sides of the frame.

The foregoing is intended merely to aid in the understanding of the background of the present disclosure, and is not intended to mean that the present disclosure falls within the purview of the related art that is already known to those skilled in the art.

SUMMARY OF THE INVENTION

Accordingly, the present disclosure is intended to conveniently interlock a solar cell panel having a frame fabricated with two types of sides having different widths by using one corner piece regardless of the different widths of the frame.

According to an embodiment of the present disclosure, there is provided a corner piece for palletization of solar cell panels, the corner piece including: a right-angled corner part configured to cover two right-angled sides of a frame that constitutes a solar cell panel, at a corner of the frame; a support piece enabling the frame to be laid thereon, at a corner of a bottom surface of an inner side of the right-angled corner part; a pressing piece extending inward from a top of the right-angled corner part in an integrated manner so as to press a top of the frame, and provided with a first locking protrusion placed at a lower side of a distal end of the pressing piece so as to be locked to an inner side of the frame; a fixing protrusion part protruding upward from the top of the right-angled corner part having a right-angled shape; and a concave hole formed in a lower surface of the right-angled corner part and enabling the fixing protrusion part formed on the top of the right-angled corner part of another corner piece to be inserted into the concave hole for combination of the corner pieces, wherein when stacking a solar cell panel which is fabricated with two types of sides of the frame having different widths, in order to be locked to the inner side of the frame regardless of the two types of sides of the frame differing in width, the lower side of the pressing piece having the first locking protrusion at the distal end of the pressing piece is also provided with a second locking protrusion for being locked to the inner side of the frame having a narrow one of the different widths, and wherein the second locking protrusion is formed at a lower side of a tension piece which is made to be elastically moved by tension force by cutting three sides of the pressing piece except one side thereof, so that when the first locking protrusion formed at the distal end of the lower side of the pressing piece is locked to the inner side of the frame, the tension piece is bent by the tension force, whereby the first locking protrusion formed at the lower side of the distal end of the pressing piece is locked to the inner side of the frame while the pressing piece is in contact with a top of the frame without being disturbed by the second locking protrusion formed at the lower side of a tension piece.

In addition, at the lower side of the pressing piece, the tension piece having the second locking protrusion is thinner than the pressing piece and the second locking protrusion has a height such that even when the second locking protrusion is positioned on the top of the frame and the tension piece is bent, the second locking protrusion is not exposed out of an upper side of the pressing piece, so there is no problem with stacking of the solar cell panels.

According to the present disclosure, when stacking the manufactured solar cell panel for storage and transportation, a corner piece assembled with each corner of the solar cell panel prevents the solar cell panel from colliding with each other, and the corner pieces that are interlocked up and down can make the solar cell panels stably stacked. Regardless of the width of the frame that has different two types, a fixing protrusion placed on the corner piece is fixed on the inner side of the frame, so the one corner piece can be used for a solar cell panel having a frame fabricated with two types of sides having different widths, the production cost of the corner piece can be lowered, and the work efficiency can be increased.

BRIEF DESCRIPTION OF THE DRAWINGS

The above and other objectives, features, and other advantages of the present disclosure will be more clearly understood from the following detailed description when taken in conjunction with the accompanying drawings, in which:

FIGS. 1A and 1B are plan views showing a configuration of a solar cell panel, wherein

FIGS. 7A and 7B are plan views showing corner pieces according to the exemplary embodiment of the present disclosure, wherein FIGS. 8A and 8B are cross-sectional views showing corner pieces according to the exemplary embodiment of the present disclosure, wherein

DETAILED DESCRIPTION OF THE INVENTION

Hereinbelow, exemplary embodiments of the present disclosure will be described in detail with reference to the accompanying drawings. Throughout the drawings, the same reference numerals will refer to the same or like parts.

Figure 2:
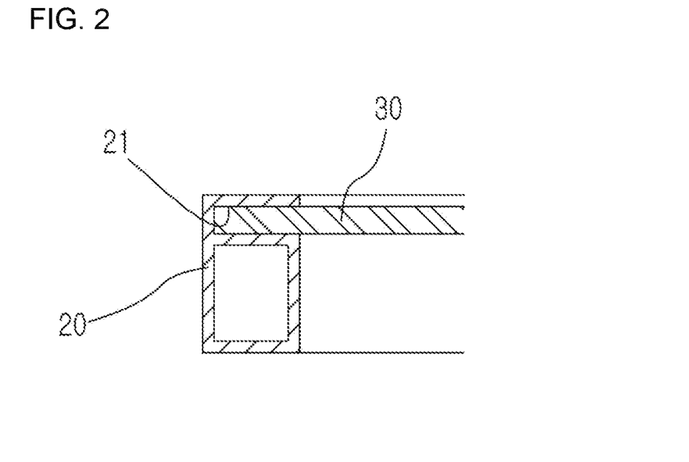
FIG. 2 is an enlarged partial cross-sectional view illustrating the configuration of a solar cell panel.

Before the description of the prevent disclosure, as shown in FIGS. 1A and 1B, and FIG. 2, a solar cell panel 10 is assembled in a rectangular shape with both ends of each side 20 of the frame or side 20a of the frame in contact with each other. The solar cell panel 10 includes a solar cell plate 30 and a solar electrode element (not shown). The solar cell panel 30 is made of glass and has a large area, and the outer perimeter thereof is inserted into an insertion hole 21 formed in the frame. The solar electrode element collects solar heat on one side of the solar cell panel.

The solar cell panel 10 forms a rectangular shape by using a frame having sides 20 in the same width as shown in FIG. 1A. Otherwise, the solar cell panel 10 forms a rectangular shape by a frame having two types sides 20 and 20a differing in width as shown in FIG. 1B.

Figure 3:
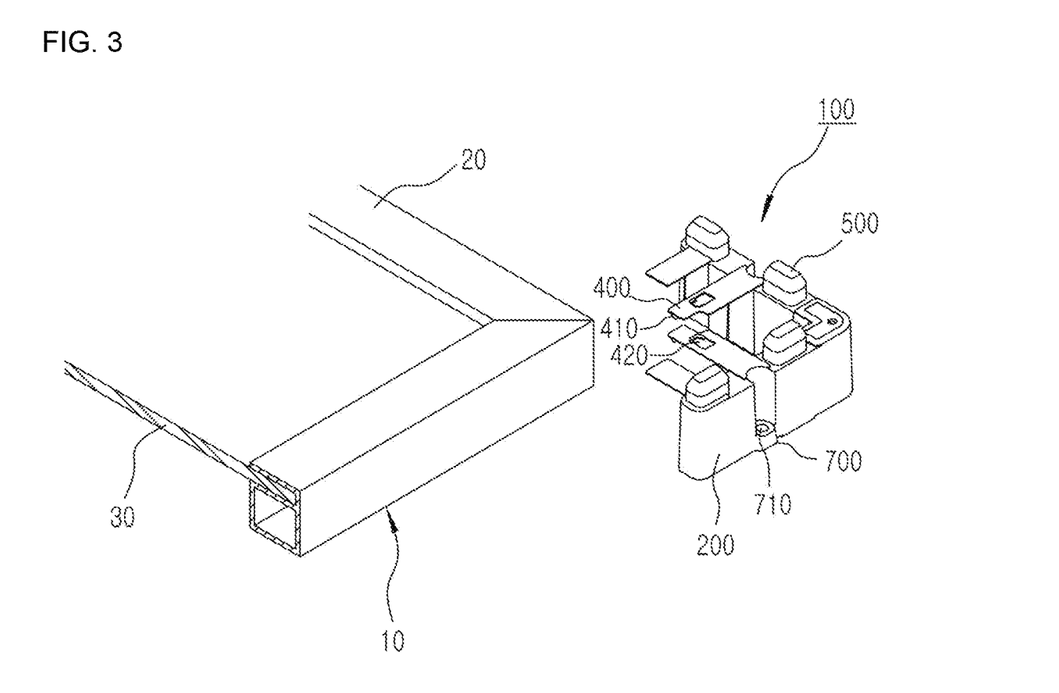
FIG. 3 is a perspective view showing the composition of a corner piece according to an exemplary embodiment of the present disclosure.
Figure 5:
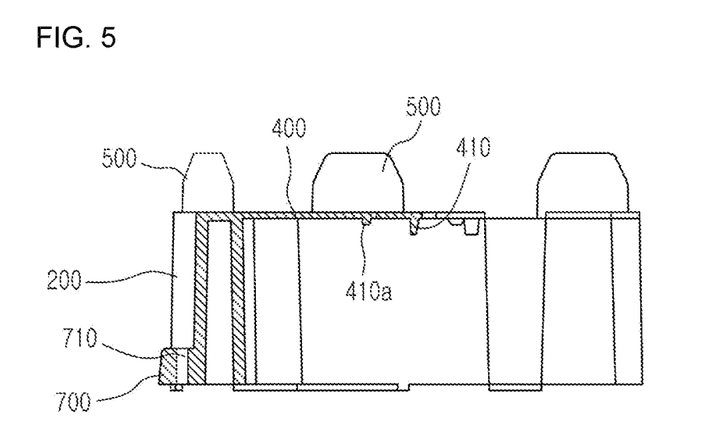
FIG. 5 is a cross-sectional view of FIG. 4 taken along line A-A.
Figure 6:
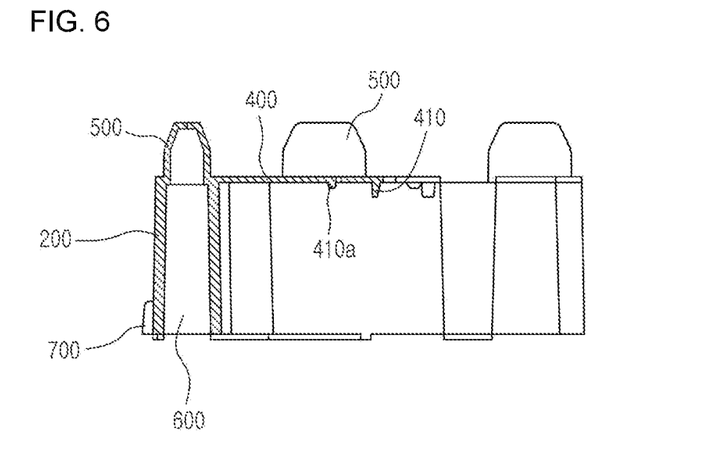
FIG. 6 is a cross-sectional view of FIG. 4 taken along line B-B.

According to the present disclosure, a corner piece 100 is to prevent direct contact between frames when the panels of the above-described configuration are stacked, are shown in FIGS. 3 and 6.

Figure 4:
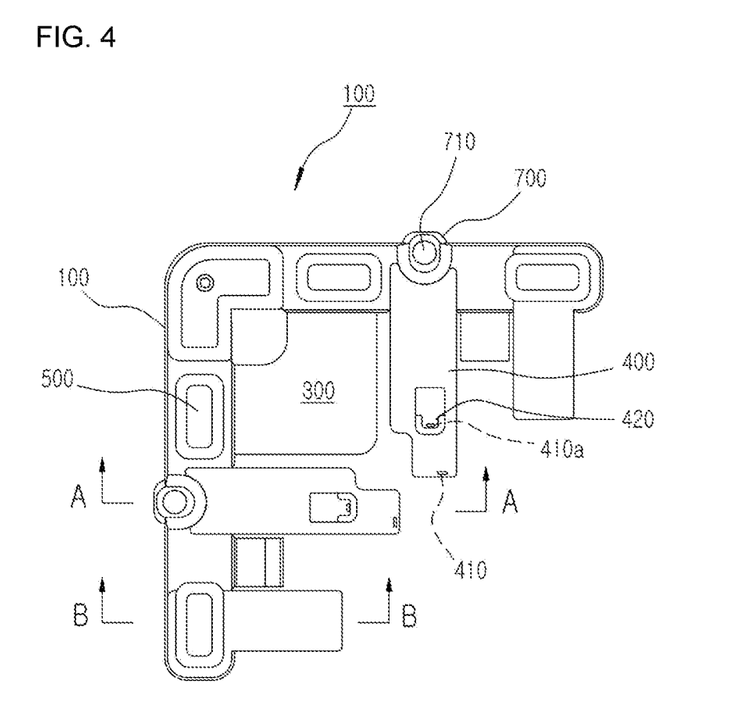
FIG. 4 is a plan view showing configuration of the corner piece according to the exemplary embodiment of the present disclosure.

FIG. 3 is a perspective view showing the configuration of a corner piece according to an exemplary embodiment of the present disclosure, FIG. 4 is a plan view showing the configuration of the corner piece according to the exemplary embodiment of the present disclosure, FIG. 5 is a cross-sectional view of FIG. 4 taken along line A-A, and FIG. 6 is a cross-sectional view of FIG. 4 taken along line B-B.

The corner piece 100 according to the present disclosure includes a right-angled side part covering two surfaces of the corner of the frame that is formed by the sides 20 and forms a solar cell panel 10; a support piece 300 that enables the side 20 of the frame to be laid at the lower side of the inner side of the right-angled corner part; a pressing piece 400 that extending inward in an integrated manner from the upper side of the right-angled corner part to press the top of the side 20 of the frame, and provided with first and second locking protrusion 410 and 410a placed on the tip and the inner side on the lower side of the pressing piece 400, respectively, to be fixed on an inner side of the sides 20 and 20a of the frame that formed at a right angle starting from the corner of inner side of the corner part 200, the corner piece can adhere to the right-angled sides 20 and 20a of the frame.

The second locking projection 410a is located at a midpoint of a bottom surface of the pressing piece 400, and is fixed on the inner side of the side 20a of the frame. A tension piece 420 made by cutting three sides of the pressing piece 400 is provided at the point where the second locking projection 410a is located, so that when the side 20 of the frame is used, the first locking protrusion 410 can be smoothly fixed on the inner side of the side 20 of the frame while the pressing piece 400 adheres to the top of the side 20 of the frame. When the second locking protrusion 410a is pressed up by the top of the frame, the tension piece 420 elastically moves upward. Therefore, the first locking protrusion 410 is fixed on an inner side of the side 20 of the frame because the pressing piece 400 maintains a status of adhering on the top of the side 20 of the frame without interference of the second locking protrusion 410a.

The corner piece 100 also includes a fixing protrusion part 500 and a concave hole 600. The fixing protrusion part 500 protrudes upward from the top of the right-angled corner part having a right-angled shape. The concave hole 600 is formed in the lower surface of the right-angled corner part. The fixing protrusion part 500 placed on the top of the right-angled corner part of another corner piece is inserted into the concave hole 600 for combination of the corner pieces.

The right-angled corner part 200 configured to cover two right-angled sides of the frame that constitutes the solar cell panel at a corner of the frame.

When stacking the solar cell panels, the corner piece 100 placed on the bottom and another corner piece (not shown) placed on the ground are fixed in a fastened manner by a fixing piece 700 so that corner pieces do not move arbitrarily.

The vertical surface portion 200 of the corner piece 100 of the present disclosure having the above configuration is pushed in contact with each corner of the side 20 of the frame, the lower side of the side 20 of the frame is placed on the support piece 300 located at the lower end of the right-angled corner part 200, and the pressing piece 400 located on the top of the right-angled corner part 200 is placed on the top of the side 20 of the frame.

Figure 7A:
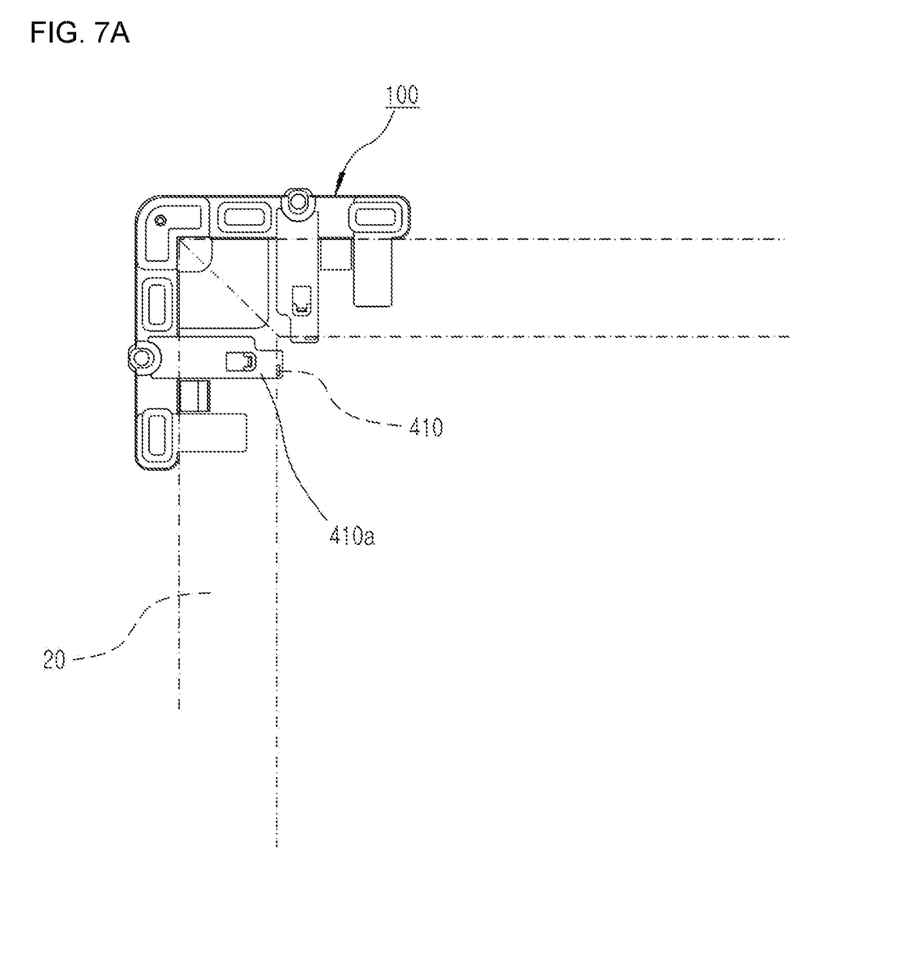
FIG. 7A shows a corner piece assembled with the sides of the frame having the same width.
Figure 8A:
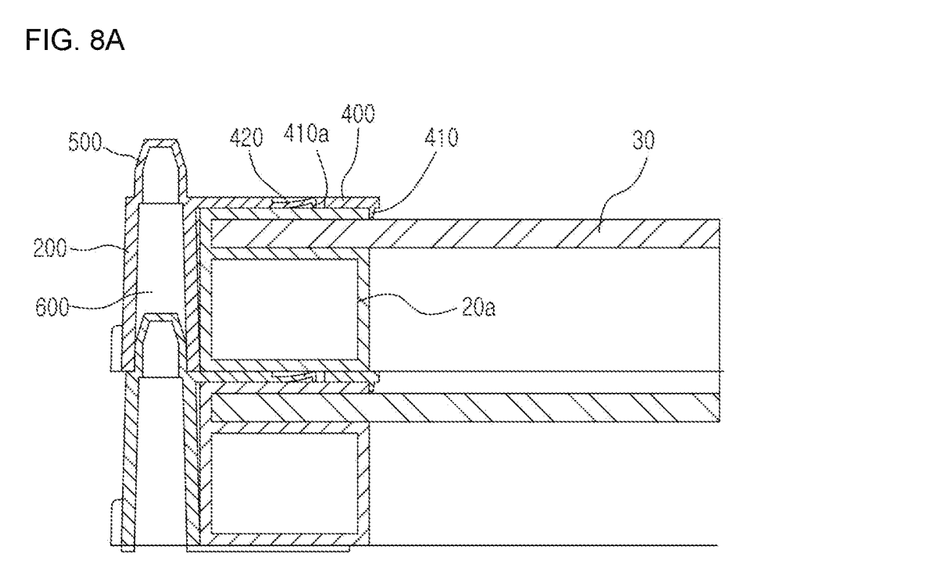
FIG. 8A shows a corner piece assembled with the sides of the frame of the same width.
Figure 8B:
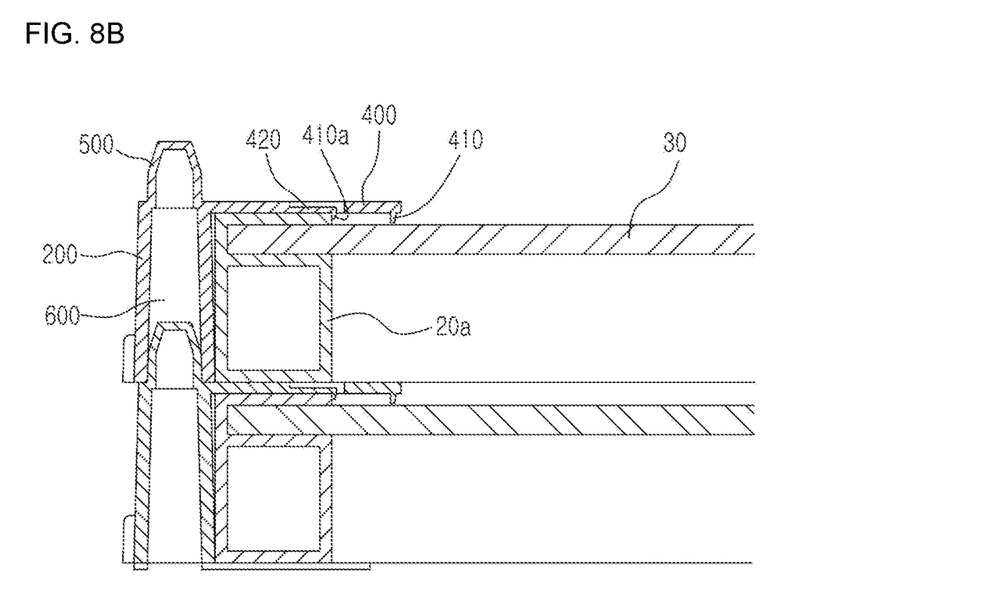
FIG. 8B shows a corner piece assembled with the sides of the frame of different widths.

The first locking protrusion 410 and the second locking protrusion 410a are provided at the lower side of the pressing piece 400. The first locking protrusion 410 is fixed on the inner side of the side 20 of the frame and the second locking protrusion 410a is fixed on the inner side of the side 20a of the frame. When the frame that forms the solar cell panel 10 has sides 20 in the same width, the first locking protrusion 410 is fixed on the inner side of each side 20 of the frame as shown in FIG. 7A. In this case, as shown in FIG. 8A, the second locking protrusion 410a provided on the middle portion of the lower side of the pressing piece 400 moves upward by the tension of the tension piece 420, so that the second locking protrusion 410a is placed on the upper surface of the side 20 of the frame.

Figure 7B:
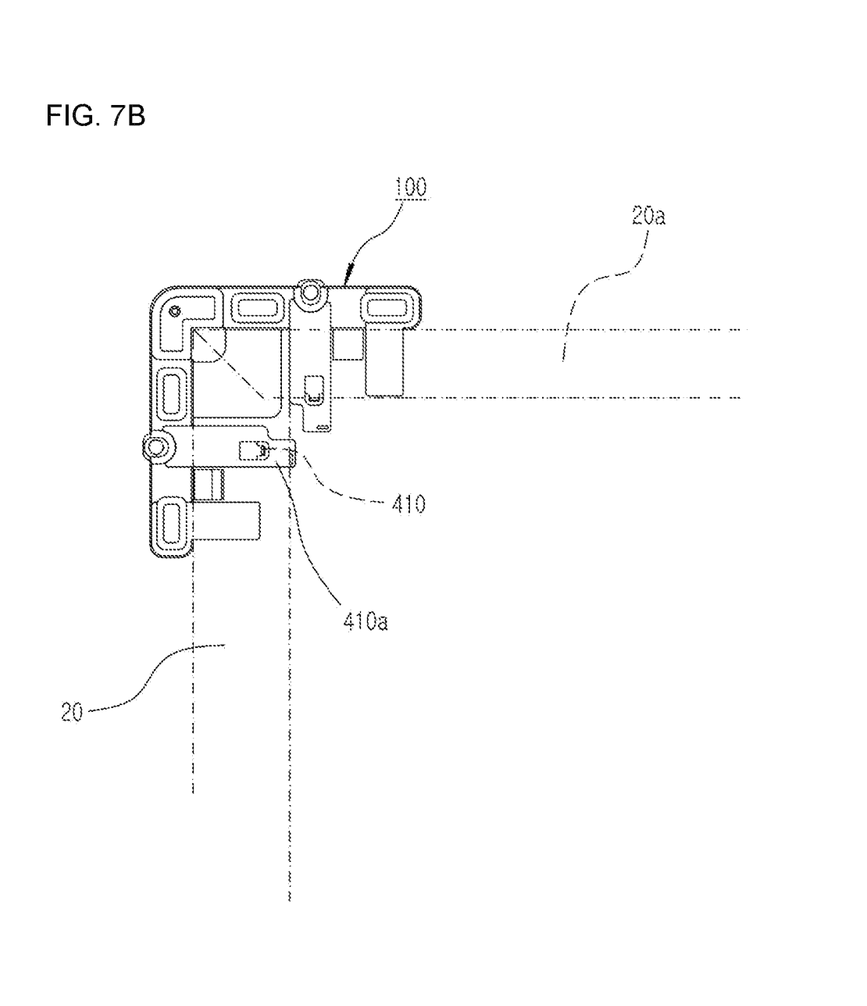
FIG. 7B shows a corner piece assembled with the sides of the frame having different widths.

If panel 10 is composed of a frame having two types of sides 20 and 20a differing in width, the corner piece 100 is fitted to the corner of the frame constituting the panel 10, as shown in FIG. 7B. Accordingly, the first locking protrusion 410 formed at the lower surface of the distal end of the pressing piece 400 is fixed on the inner side of the wide side of the frame, and the second locking protrusion 410a provided on the pressing piece 400 is fixed on the inner side of the narrow side 20 of the frame.

In the above situation, the corner piece 100 is interlocked at each corner of the panel 10, and a fixing protrusion 500 is provided on the top of the right-angled corner part 200 of the corner piece 100 interlocked at the corner of each panel 10. The fixing protrusion 500 of the corner piece 100 is inserted into the concave hole 600 formed in the lower surface of the right-angled corner part 200 of another corner piece that is interlocked with the corner of another panel 10 to stack the panels 10 in several layers. Therefore, the corner pieces 100 interlocked with the corners of the panels 10 are stacked in order, so the stacked panels do not fall over during storage and transport.

Although a preferred embodiment of the present disclosure has been described for illustrative purposes, those skilled in the art will appreciate that various modifications, additions and substitutions are possible, without departing from the scope and spirit of the disclosure as disclosed in the accompanying claims.

What is claimed is:

1. A corner piece for palletization of solar cell panels, the corner piece comprising:
    a right-angled corner part configured to cover a right-angled corner of a frame of a solar cell panel;
    a support piece enabling the frame to be laid thereon, at a corner of a bottom surface of an inner side of the right-angled corner part;
    a pressing piece extending inward from a top of the right-angled corner part in an integrated manner so as to press a top of the frame, and provided with a first locking protrusion placed at a lower side of a pressing piece distal end of the pressing piece so as to be locked to an inner side of the frame, wherein the inner side of the frame extends between the top and a bottom of the frame;
    a fixing protrusion part protruding upward from the top of the right-angled corner part; and
    a concave hole formed in a lower surface of the right-angled corner part and enabling the fixing protrusion part formed on the top of the right-angled corner part of another corner piece to be inserted into the concave hole for combination of the corner pieces,
    wherein when stacking a solar cell panel which has a frame fabricated with two types of sides differing in width, in order to be locked to the inner side of the frame regardless of the two types of sides of the frame differing in width, the lower side of the pressing piece having the first locking protrusion at the pressing piece distal end is also provided with a second locking protrusion configured for being engaged and locked to the inner side of the frame having a narrow one of the different widths; and
    the second locking protrusion is formed at a lower side of a tension piece and depends downwardly substantially at a right angle from the lower side of the tension piece, wherein the tension piece is elastic, wherein the tension piece has a proximal end and a tension piece distal end and side ends between the proximal end and the tension piece distal end, wherein the proximal end is attached to the pressing piece, wherein the tension piece distal end and side ends are spaced from the pressing piece to define a gap located between the pressing piece and the tension piece distal end and the side ends of the tension piece, wherein the gap and the tension piece are configured to enable the tension piece to bend upwardly relative to the pressing piece so that when the first locking protrusion formed at the distal end of the lower side of the pressing piece is locked to the inner side of the frame, the tension piece is bent by the tension force to allow the pressing piece to be in contact with a top of the frame without being disturbed by the second locking protrusion placed at the lower side of the pressing piece.

2. The corner piece of claim 1, wherein at the lower side of the pressing piece, the tension piece having the second locking protrusion is thinner than the pressing piece and the second locking protrusion has a height such that even when the second locking protrusion is positioned on the top of the frame and the tension piece is bent, the second locking protrusion is not exposed out of an upper side of the pressing piece.

3. The corner piece of claim 1, wherein an upper side of the tension piece is exposed, wherein the upper side of the tension piece is lower than an upper side of the pressing piece.

4. The corner piece of claim 3, wherein the upper side of the tension piece is lower than the upper side of the pressing piece at a sufficient distance that allows the tension piece to bend upwardly relative to the pressing piece but not upwardly beyond the upper side of the pressing piece.

5. The corner piece of claim 4, wherein the tension piece has a bottom side, wherein the bottom side extends between the tension piece distal end and the proximal end of the tension piece, wherein the bottom side is co-planar with the lower side of the pressing piece when the tension piece is not bent.

6. The corner piece of claim 1, wherein the gap and the tension piece are configured to enable the tension piece to pivot upwardly relative to the pressing piece.

7. The corner piece of claim 1, wherein the tension piece has a bottom side, wherein the bottom side extends between the tension piece distal end and the proximal end of the tension piece, wherein the bottom side is co-planar with the lower side of the pressing piece when the tension piece is not bent.

8. An apparatus comprising:
a solar cell panel:
a frame, wherein the frame receives the solar cell panel, wherein the frame includes at least two longitudinal sides and at least two lateral sides and along a light incident surface of the solar cell panel, the width of the longitudinal sides is greater than the width of the lateral sides; and
a solar cell panel corner piece for palletization of at least another solar cell panel, the corner piece comprising:
a right-angled corner part, wherein the right-angled corner part covers a right-angled corner of the frame of the solar cell panel
a support piece enabling the frame to be laid thereon, at a corner of a bottom surface of an inner side of the right-angled corner part;
at least first and second pressing pieces, wherein each of the first and second pressing pieces has a pressing piece distal end, wherein each of the first and second pressing pieces extends inwardly from a top of the right-angled corner part in an integrated manner so as to press a top of the frame, and provided with a first locking protrusion placed at a lower side of the pressing piece distal end, wherein the first locking protrusion of the first pressing piece is locked to an inner side of one of the at least two longitudinal sides of the frame;
a fixing protrusion part protruding upward from the top of the right-angled corner part; and
a concave hole formed in a lower surface of the right-angled corner part and enabling the fixing protrusion part formed on the top of the right-angled corner part of another corner piece to be inserted into the concave hole for combination of the corner pieces, wherein a lower side of each of the first and second pressing pieces is provided with a second locking protrusion,
wherein the second locking protrusion of each of the first and second pressing pieces is formed at a lower side of a tension piece and depends downwardly from the lower side of the tension piece, wherein the tension piece is elastic, wherein the second locking protrusion of the second pressing piece is engaged and locked to an inner side of one of the at least two lateral sides of the frame, wherein the inner sides of the at least two longitudinal sides and the at least two lateral sides of the frame extend between the top and a bottom of the frame, wherein the tension piece of the second locking protrusion of the first pressing piece is bent by the tension forces and elastically moved such that the first pressing piece is in contact with the top of one of the at least two longitudinal sides of the frame without being disturbed by the second locking protrusion placed at the lower side of the first pressing piece.

9. The apparatus of claim 8, wherein each of the tension pieces has a proximal end and a tension piece distal end and side ends between the proximal end and the tension piece distal end, wherein the proximal end is attached to the respective pressing piece, wherein the tension piece distal end and side ends are spaced from the respective pressing piece to define a gap located between the respective pressing piece and the tension piece distal end and the side ends of the tension piece, wherein the gap and the tension piece are configured to enable the tension piece to move upwardly relative to the respective pressing piece.

10. The apparatus of claim 9, wherein at the lower side of each of the first and second pressing pieces, the tension piece having the second locking protrusion is thinner than the respective pressing piece and the second locking protrusion has a height such that even when the second locking protrusion is positioned on the top of the frame and the tension piece is bent, the second locking protrusion is not exposed out of an upper side of the respective pressing piece.

11. The apparatus of claim 9, wherein an upper side of each of the tension pieces is exposed, wherein the upper side of each of the tension pieces is lower than an upper side of the respective pressing piece.

12. The apparatus of claim 11, wherein the tension piece of the first pressing piece is bent upwardly relative to the first pressing piece but does not extend upwardly beyond the upper side of the pressing piece.

13. The apparatus of claim 12, wherein the tension piece of the second pressing piece has a bottom side, wherein the bottom side extends between the tension piece distal end and the proximal end of the tension piece, wherein the bottom side is co-planar with the lower side of the second pressing piece.

14. The apparatus of claim 9, wherein the second locking protrusion is positioned at the tension piece distal end.

15. The corner piece of claim 1, wherein the second locking protrusion is positioned at the tension piece distal end.

16. The apparatus of claim 9, wherein the second locking protrusion depends downwardly substantially at a right angle from the lower side of the tension piece.

17. The apparatus of claim 9, wherein the second locking protrusion includes a first surface that contacts a second surface of the inner side of one of the at least two lateral sides, wherein the first surface is conformal with the second surface.

\* \* \* \* \*

UNITED STATES PATENT AND TRADEMARK OFFICE
CERTIFICATE OF CORRECTION

PATENT NO. : 11,870,387 B2
APPLICATION NO. : 17/150544
DATED : January 9, 2024
INVENTOR(S) : Sang Chae Yoo Page 1 of 1

It is certified that error appears in the above-identified patent and that said Letters Patent is hereby corrected as shown below:

On the Title Page

At (71), Applicant - Sang Chae Chung Yoo - should be corrected to -- Sang Chae Yoo --

At (72), Inventor - Sang Chae Chung Yoo - should be corrected to -- Sang Chae Yoo --

Signed and Sealed this
Fifth Day of March, 2024

Katherine Kelly Vidal
*Director of the United States Patent and Trademark Office*